United States Patent
Stinson et al.

[11] Patent Number: 5,862,992
[45] Date of Patent: Jan. 26, 1999

[54] ADJUSTABLE DUAL CONE SPRAY PATTERN VALVE APPARATUS AND RELATED METHODS

[75] Inventors: Douglas L. Stinson, Duluth; Brian D. Stinson, Cumming, both of Ga.; Scott D. Ross, Lee's Summit, Mo.; John C. Brunson, Duluth, Ga.; Robert G. Anderson, Belton, Mo.

[73] Assignee: Sterling Deaerator Company, Cumming, Ga.

[21] Appl. No.: 799,255

[22] Filed: Feb. 14, 1997

[51] Int. Cl.⁶ .................................. B05B 1/14; B05B 1/30
[52] U.S. Cl. ........................... 239/440; 239/444; 239/453; 239/459
[58] Field of Search ..................... 239/440, 443, 239/444, 453, 459, 506, 513, 516, 533.1, 541, 570, 571, 579

[56] References Cited

U.S. PATENT DOCUMENTS

| | | |
|---|---|---|
| 1,098,884 | 6/1914 | Comstock . |
| 1,381,646 | 6/1921 | Kirgen ..................................... 239/440 |
| 1,731,090 | 10/1929 | Beeby . |
| 1,893,298 | 1/1933 | Moore . |
| 2,127,188 | 8/1938 | Schelling et al. . |
| 2,313,994 | 3/1943 | Grant ...................................... 239/440 |
| 2,393,328 | 1/1946 | Mahone . |
| 2,530,808 | 11/1950 | Cerasi . |
| 2,582,527 | 1/1952 | Burnett . |
| 2,629,633 | 2/1953 | Wright . |
| 3,363,842 | 1/1968 | Burns . |
| 3,904,125 | 9/1975 | Allenbaugh .............................. 239/541 |
| 4,958,771 | 9/1990 | Klomp .................................... 239/453 |
| 4,991,780 | 2/1991 | Kannan et al. .......................... 239/459 |

FOREIGN PATENT DOCUMENTS 957490  8/1949  France .

*Primary Examiner*—Lesley D. Morris
*Attorney, Agent, or Firm*—Law Office of Jon M. Jurgovan

[57] ABSTRACT

The invented spray valve DEFINES two orifices that generate respective spray patterns. Preferably, the spray patterns are each conical in shape and coaxially configured so that the inside spray pattern is enveloped by the outside spray pattern. The spray valve includes two bias units that urge respective orifices to close, in a direction contrary to pressure exerted by a pressurized fluid supplied to the spray valve, that urges the orifices to open. The bias units are independently adjustable to control the amount by which each orifice is urged to close so that the proportional variation of the orifice opening size to a given variation in the fluid flow rate through the orifice, or equivalently, the fluid pressure differential across each orifice, maintains the continuity of the spray patterns over a broad range of fluid flow rates. The bias units thus allow adjustment so that the spray patterns can be maintained relatively thin or film-like with a uniform, continuous, and uninterrupted surface area so that the spray pattern surface area is maximized. The relatively large surface area of the spray pattern is useful in a variety of technologies, including fluid deaeration and purification. Advantageously, the spray valve defines the first and second orifices with relatively few parts to economize on the amount of material needed to manufacture the spray valve. The invention also includes related methods.

16 Claims, 4 Drawing Sheets

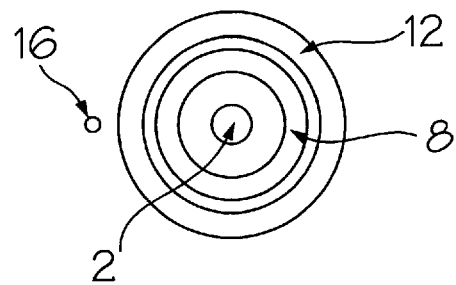
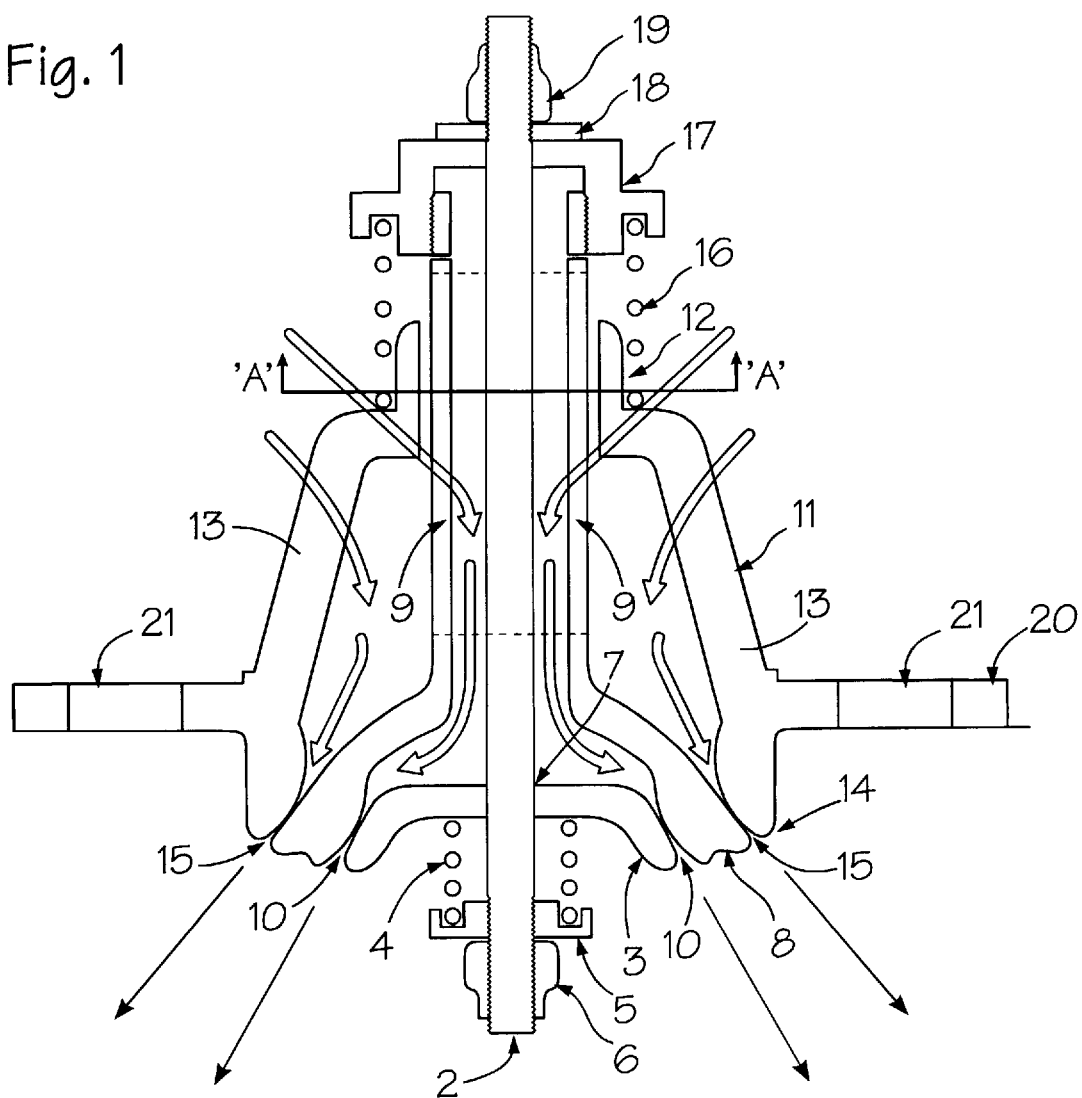

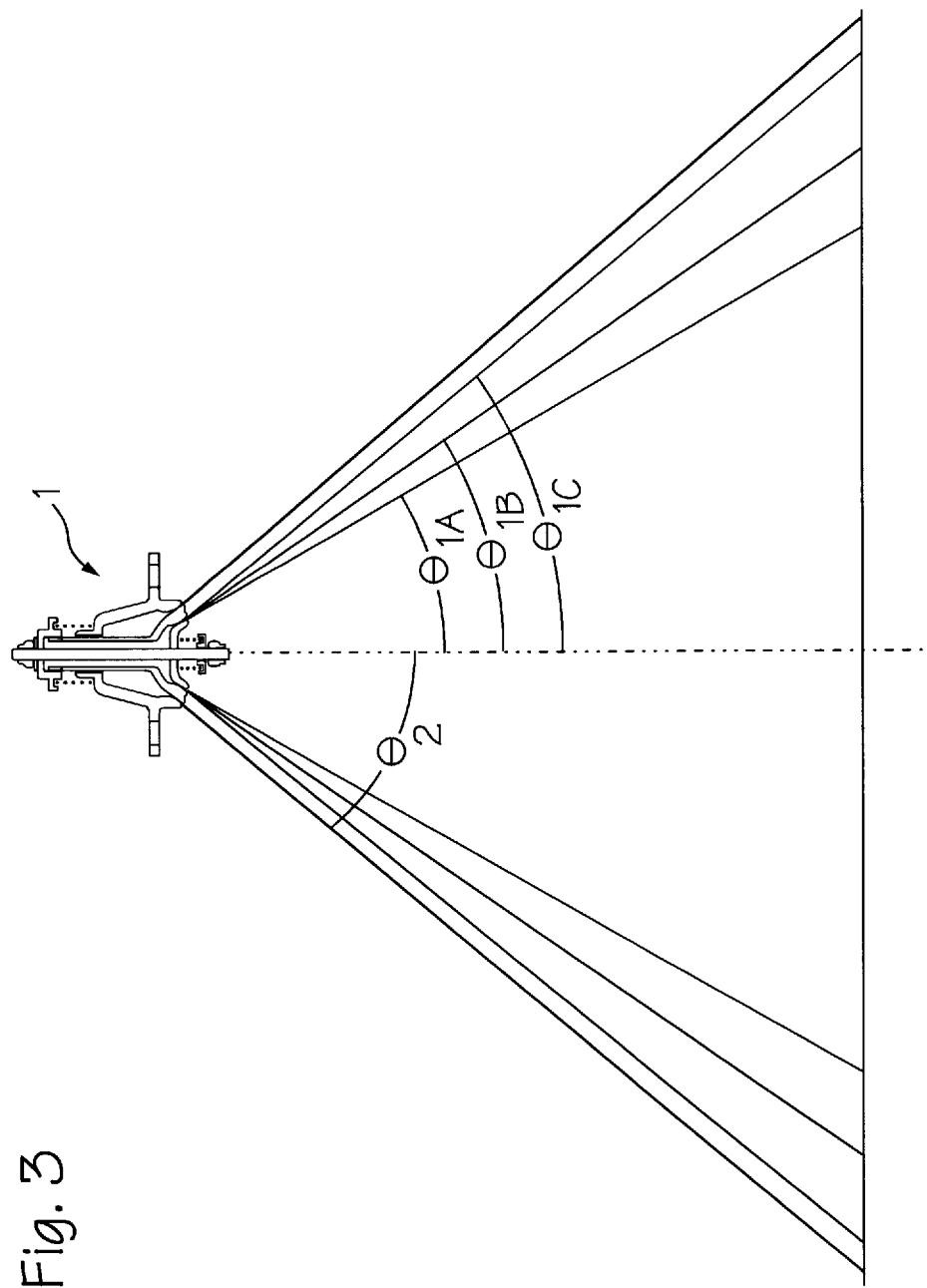

ADJUSTABLE DUAL CONE SPRAY PATTERN VALVE APPARATUS AND RELATED METHODS

BACKGROUND OF THE INVENTION

1. Field of the Invention

This invention is directed to an apparatus and methods for spraying fluid in a dual cone spray pattern with high uniformity over a range of fluid flow rates. The apparatus and methods are useful in a variety of technologies including fluid deaeration and purification.

2. Description of the Related Art

In various technologies, fluid is required to be sprayed in a continuous, thin film with a relatively large surface area. For example, to reduce corrosion and increase the useful life of boiler systems and the like, the incoming boiler feedwater is deaerated to remove noncondensable gases such as oxygen and carbon dioxide, that are highly reactive and therefore corrosive, particularly at the elevated operating temperatures present in boiler systems. Deaeration of the feedwater in such boiler systems is thus important to reduce corrosion to extend the useful life of the boiler system. In addition, due to the relatively high pressures and temperatures present in boilers, deaeration can be important for the prevention of a catastrophic failure or rupture of the boiler system and the attendant danger such failure would pose to a person or property in the vicinity of the boiler.

To deaerate the feedwater, before introduction to the boiler system, the feedwater is sprayed into relatively pure steam that is depleted in noncondensable gases. Because the solubility of the noncondensable gases in the feedwater depends on the partial pressure of each gas in the atmosphere surrounding the feedwater, the pure steam draws the noncondensable gases out of the fluid. In addition, the solubility of many noncondensable gases including oxygen and carbon dioxide, is inversely proportional to the temperature, so the heating action of the steam upon the feedwater further causes the feedwater to release dissolved gases. The steam thus deaerates the feedwater by heating and reducing the solubility of the noncondensable gases in the feedwater.

The manner of spraying the feedwater into the steam is an important factor in accomplishing deaeration. The desired spray pattern should be generated from a spray valve in a relatively thin, continuous conical pattern allowing the steam to act uniformly over the maximum possible area of the feedwater spray pattern. Moreover, the spray valve should be capable of generating its spray pattern for a broad range of feedwater flow rates. In addition, the area of the sprayed feedwater pattern should be as large as possible to maximize the area upon which the steam can act to deaerate the sprayed feedwater. Although more than one spray valve can be used to increase the feedwater flow rate into a given space, because the spray patterns of adjacent spray valves will interfere with one another to cause the spray pattern to be nonuniform, there is a limit as to how closely the spray valves can be placed. Also, the use of a greater number of spray valves adds significantly to the deaerator's cost. Therefore, it would be desirable to produce a spray valve and methods that generate a highly uniform spray pattern with an enhanced fluid surface area over a broad range of fluid flow rates, with relatively few parts and thus at a reduced cost, relative to previous spray valves.

SUMMARY OF THE INVENTION

This invention overcomes the above-noted disadvantages. In accordance with this invention, a spray valve apparatus defines a first continuous orifice that generates a first spray pattern from a flow of fluid supplied to the spray valve from a pressurized source. The spray valve also defines a second continuous orifice positioned exteriorly of the first continuous orifice, that generates a second spray pattern from the fluid flow. Preferably, the spray valve generates the first and second spray patterns so that the patterns have continuous conical surfaces without interruption or breaks in the flow pattern, and so that the second spray pattern envelops the first spray pattern. In a preferred embodiment, the spray valve includes a valve head, a hollow member, and a housing with a lip, that define the first and second orifices. More specifically, the first orifice is defined between an outer edge surface of the valve head and an inside surface of a flared end portion of the member. The second orifice is defined between an inside surface of the lip and an outside surface of the member's flared portion.

To vary respective sizes of the first and second orifices to accommodate different fluid flow rates, the spray valve preferably includes first and second bias units that urge respective first and second orifices to close. In the preferred embodiment, the first bias unit urges the outer edge surface of the valve head toward the inside surface of the member's flared end portion, and the second bias unit urges the outer surface of the member's flared end portion toward the inside surface of the lip. The first and second bias units are independently adjustable to control the proportional variations in sizes of respective first and second orifices, based on corresponding variations in flow rates through the first and second orifices. The first and second bias units can also be adjusted to set the initial orifice sizes in the absence of a pressure differential across the orifices, or to set the pressure differentials required to open the orifices.

Advantageously, because of the independent adjustability of the first and second bias units of the invented spray valve apparatus, the first and second orifices can be made to vary in size independently and in predetermined proportions to accommodate different fluid flow rates through respective orifices. Accordingly, the first and second conical spray patterns can be made thin, uniform and continuous without interruption or break, over a broad range of fluid flow rates, a major advantage in many applications including deaeration and purification of the sprayed fluid. In addition, the two conical spray patterns allow for a relatively high fluid flow rate and spray surface area compared to previous spray valves, features that are highly desirable in fluid deaeration and purification applications. Also, because the invented spray valve includes the member that defines surfaces of both the first and second orifices, the invented spray valve minimizes on the parts and material needed to manufacture the spray valve, thus providing an economical, yet highly effective, spray valve.

A first method in accordance with this invention includes a step of adjusting a first bias tending to close a first continuous orifice defined by a spray valve, and a step of adjusting a second bias tending to close a second continuous orifice defined by the spray valve, that is situated outwardly of, and that encircles, the first orifice. The method also includes a step of forcing fluid through the first and second orifices in a direction contrary to the first and second biases, to generate respective first and second continuous conical spray patterns, where the second spray pattern envelops the first spray pattern. Preferably, the step of adjusting the first bias controls the proportional variation the first orifice's size based on the fluid flow rate through the first orifice, and the step of adjusting the second bias controls the proportional variation of the second orifice's size based on the fluid flow rate through the second orifice. Advantageously, the first method allows adjustment of the spray patterns generated by the spray valve so that the spray patterns are thin, uninterrupted and continuous over a broad range of flow rates through respective first and second orifices.

A second method of this invention includes a step of varying an opening size of a first continuous orifice defined by a spray valve, that generates a first spray pattern, based on a first fluid flow rate through the first orifice. The second method also includes a step of varying an opening size of a second continuous orifice defined by the spray valve, that generates a second conical spray pattern that envelops the first conical spray pattern, based on a second fluid flow rate through the second orifice. The second method can also include a step of adjusting the spray valve to control a proportion of the varying of the opening size of the first orifice based on the fluid flow rate through the first orifice, and can include step of adjusting the spray valve to control a proportion of the varying of the second orifice based on the fluid flow rate through the second orifice. Advantageously, the second method of this invention generates a spray pattern with an enhanced surface area due to the first and second conical spray patterns, that is relatively thin, continuous and uninterrupted over a broad range of flow rates through the first and second orifices. The second method thus generates a spray pattern with maximized area due to its continuity over a broad range of fluid flow rates, a feature that is highly desirable in fluid deaeration or purification.

These together with other features and advantages, which will become subsequently apparent, reside in the details of construction and operation as more fully hereinafter described and claimed, reference being made to the accompanying drawings, forming a part hereof, wherein like numerals refer to like parts throughout the several views.

BRIEF DESCRIPTION OF THE DRAWINGS

FIG. 1 is a first cross-sectional view of a spray valve apparatus in accordance with this invention;

FIG. 2 is a second cross-sectional view of the spray valve;

FIG. 3 is a cross-sectional view of exemplary spray patterns generated by the spray valve;

DESCRIPTION OF THE PREFERRED EMBODIMENTS

Figure 4:
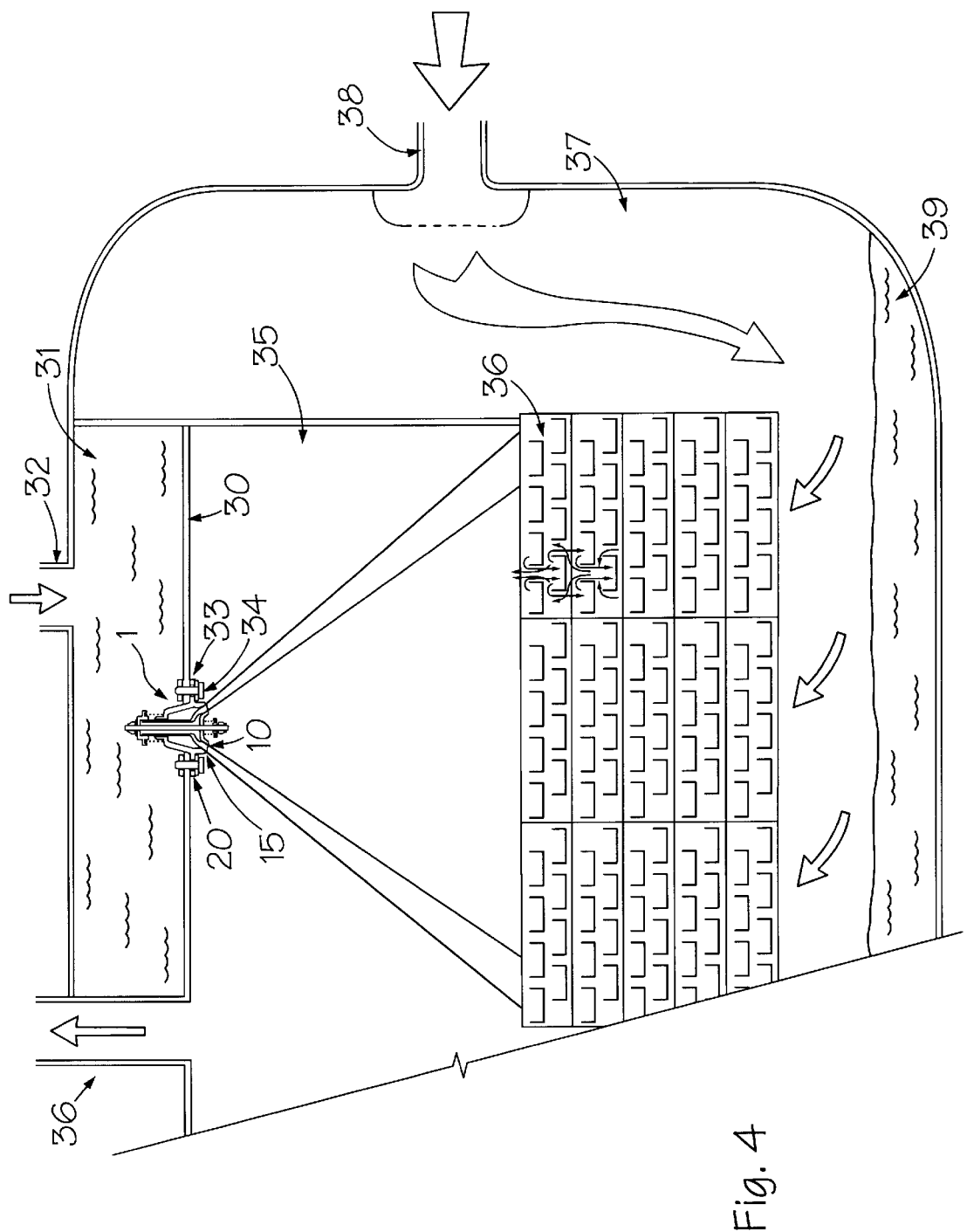
FIG. 4 is a cross-sectional view of a first system incorporating the spray valve.

In FIG. 1, a spray valve apparatus 1 in accordance with this invention, is shown in cross-section. The spray valve includes a shaft 2, a valve head 3, a spring 4, a spring retainer 5 and a nut 6. The shaft 2 is elongated, with its longitudinal axis corresponding to an axis of symmetry of the spray valve. The shaft 2 is preferably cylindrical in shape, and has two threaded ends. Over the first of the threaded ends, the valve head 3 is slidably mounted. The valve head 3 has an inverted dish- or bowl-like configuration, and defines a bore at its center symmetrical axis, through which the shaft passes. The valve head can slide along the first end portion of the shaft in a direction along the shaft's longitudinal axis. The shaft has a stop 7 that restricts the vertical movement of the valve head in FIG. 1. The stop 7 can be a ring or one or more pins, for example, welded to or formed integrally with the shaft, that extend radially outward from the shaft 2 to an extent sufficient to obstruct the valve head 3.

The spring 4 is fitted over the shaft's first end so that its coil encircles the shaft. A first end of the spring 4 is received in an annular groove formed on the underside of the valve head in the perspective of FIG. 1. The first end of the spring is thus held by the valve head's annular groove. The spring retainer 5 is also fitted over the shaft's first end. The spring retainer 5 preferably has a solid, disk-like configuration defining a central threaded bore at its symmetrical axis, through which the shaft extends. The spring retainer 5 defines threads that fit onto the shaft in proximity to the shaft's first end, and defines an annular groove on its top side that opposes the underside of the valve head 3 in FIG. 1. The groove of the spring retainer 5 receives the second end of the spring 4, so that the spring is secured in position between the valve head 3 and the spring retainer 5. The spring retainer 5 can be rotated in one direction or the other, to move the spring retainer toward or away, respectively, from the valve head 3. Therefore, by controlling the relative separation between the valve head 3 and the spring retainer 5 by rotating the spring retainer, the degree of compression of the spring 4, and hence the degree to which the valve head 3 is urged in the vertical direction in FIG. 1, can be controlled. Accordingly, the spring 4 and the spring retainer 5 may be referred to as a 'first bias unit' in this document. The nut 6 is threaded to the shaft's first end to abut the underside of the spring retainer 5. Preferably, the nut 6 is a flexloc™ nut made of silver-plated stainless steel. The nut 6 can be rotated in one direction or the other to secure in position or release, respectively, the spring retainer 5 on the shaft 2.

The spray valve 1 also includes a hollow member 8 that is roughly an inverted funnel in shape in the perspective of FIG. 1. The hollow member 8 has a tube-like portion in proximity to its first open end, that is integral with a flared end portion formed at the member's second open end. The member 8 defines a hollow interior extending between and communicating with its first and second open ends. The member's tube-like portion preferably has an elongated tube configuration with a longitudinal symmetric axis coinciding with that of the spray valve. The tube-like portion defines side openings or slots 9 positioned at radial intervals about the surface of the member, that communicate with the member's hollow interior. The member's flared end portion has smoothed, tapered inside and outside surfaces relative to the center symmetrical axis of the spray valve. In other words, in the convention adopted in this document, the inside surface of the member's flared portion faces the center symmetric axis of the spray valve, and its opposite outside surface is situated farther from the valve's symmetric axis than its inside surface. Thus, as used in this document, 'inner' or 'inside surface' indicates one of two surfaces that is closer to the center symmetric axis of the spray valve compared to its other 'outer' or 'outside surface.'

The second end of the shaft 2 is inserted into the flared end portion and through the member's hollow interior so that the outer edge surface of the valve head 3 is situated in close proximity to the inside surface of the member's flared end portion. The outer edge surface of the valve head and the inside surface of the member's flared end portion, define a first orifice 10 that is preferably circular in configuration, but that in general can have a continuous, or equivalently, a simple closed curve shape. The outer edge surface of the valve head is preferably angled from thirty to forty degrees relative to the symmetric axis of the spray valve 1. The inside edge surface of the member's flared end portion is preferably rounded so that, in a direction from the top side to the bottom edge of the valve head 3 along its angled outer surface, the first orifice 10 gradually constricts to its narrowest extent, and then gradually widens toward the rounded ends of the valve head and the flared end portion. The outer edge surface of the valve head 3 thus defines the angle of the spray pattern emitted from the spray valve relative to the valve's center symmetric axis, and the rounding of the extreme edge of the valve head 3 and the inside surface of the flared end portion ensures smooth fluid flow so that the spray pattern from the orifice 10 is continuous and unbroken.

The spray valve 1 also includes a housing 11. At its first end, the housing 11 has a collar 12 that extends from a horizontal surface, or shoulder, of the housing. The collar 12 is elongated and tube-like in configuration, and is supported relative to the remainder of the housing by legs 13. The legs 13 are preferably spaced at equal angular intervals about the symmetric axis of the spray valve. In the preferred embodiment, the housing 11 has three legs arranged at angular intervals of 120 degrees about the symmetric axis of the spray valve. The legs are spaced to provide open spaces to allow fluid to flow into the housing. At its opposite, second end, the housing 11 has a lip 14 that is preferably cylindrical in shape. The second end of the shaft 2 and the tube-like portion of the member 8 are inserted into the second, open lip end of the housing 11, and moved through the housing's hollow interior and the collar, so that they protrude from the housing's first, collared end. As so positioned, the outside surface of the member's flared end portion opposes the inside surface of the lip 14 to define a second orifice 15. Preferably, the second orifice 15 is defined to be circular, but can have any simple closed curve configuration. The member's flared end portion and the lip define the second orifice 15 so that it encircles the first orifice 10. Preferably, the outside surface of the member's flared end portion is angled with respect to the spray valve's symmetrical axis at a predetermined angle, for example, forty degrees. The inside surface of the lip is rounded so that, in a direction from the top to the bottom along the outside surface of the flared end portion, the second orifice 15 gradually constricts to its narrowest extent, and then gradually widens toward the rounded end of the flared end portion. Also, the extreme end of the flared end portion's outside surface is rounded so that fluid flow through the second orifice 15 is not interrupted.

The spray valve 1 also includes a spring 16, a spring retainer 17, a washer 18 and a nut 19. The spring 16 is fitted over the second end of the shaft 2, the end of the tube-like portion of the member 8, and the collar 12, so that a first end of the spring engages with the flat surface or shoulder of the housing 11. The collar 12 and the housing's shoulder fix the spring's first end in position relative to the housing. The spring retainer 17 is disk- or cap-like in shape and defines a threaded bore centered at its symmetric axis, that is threaded onto the member's second end. The underside of the retainer 17 defines annular groove in which is seated the second end of the spring 16. The washer 18 is disk- or plate-like in shape, and defines a central bore at its symmetric axis, of sufficient diameter to allow the shaft's second end to pass therethrough with a relatively tight and secure fit. The spring retainer 17 is threaded to the second end of the member 8 and compresses the spring 16 between the retainer 17 and the housing's shoulder, by an amount determined by the degree to which the retainer 17 is tightened or loosened by rotation relative to the member 8. The spring 16 and the spring retainer 17 may be referred to as a 'second bias unit' in this document. The nut 19 is tightened in contact with the washer 18 to lock the retainer 17 in position, or conversely, is loosened to allow adjustment of the spring retainer 17, by rotating the nut 19 relative to the shaft 2.

For attachment of the spray valve 1 to a surface (not shown in FIG. 1), the housing 11 has a flange 20 formed integrally therewith. The flange 20 has an oval shape including two wings on opposite sides of the spray valve 1. Each wing of the flange 20 defines respective vertically-extending bores 21 to receive bolts, rivets or the like (not shown in FIG. 1), for mounting the spray valve to the surface. The spray valve 1 is attached to a surface or mounting with the flange 20 in a water-tight manner, so that the portion of the housing 11 above the flange 20 in FIG. 1, communicates with a pressurized source of the fluid that is to be sprayed, and so that the portion of the housing below the flange 20 of FIG. 1, is situated in communication with the area in which the fluid is to be sprayed. For deaeration, a preferred differential pressure across the spray valve from its fluid input to output sides, is about two pounds per square inch (PSI), although the spray valve can be manufactured to function effectively over a very broad range of pressure values from fractions to several tens or even hundreds of PSI. The pressure external to the spray valve in proximity to the first and second orifices is typically in a range from five to fifty pounds per square inch, although in unusual applications, the external pressure can range downward to atmospheric pressure. In any event, if the fluid pressure is sufficiently high relative to the pressure external to the spray valve, the spray valve will generate two concentric spray patterns with a correspondingly large surface area, a great advantage in fluid deaeration and purification applications. Further, due to their spring-biasing, the spray valve is self-adjusting so that the first and second orifices vary in a proportion determined by the amount of biasing to accommodate differing fluid flow rates. Thus, the spray patterns are maintained relatively thin, uniform and continuous with maximized surface areas over a broad range of flow rates, whether steady-state or transient.

Preferably, all of the aforementioned components of the spray valve 1 are formed from non-corrosive material such as type "316-L" stainless steel with argon-oxygen carburization. With the exception of the springs, the spray valve's components can be die-cast or machined from stainless steel workpieces. The springs 4, 16 can be made with suitable diameters by appropriately coiling respective stainless steel wires.

FIG. 2 is a cross-sectional view of the spray valve 1 along section 2—2 in FIG. 1. As can be seen in FIG. 2, the spray valve 1 is preferably symmetric about its central axis that coincides with the longitudinal axis of the shaft 2. The tube-like portion of the member 8 surrounds, and is coaxial with, the shaft 2. The collar 12 surrounds and is preferably coaxial with both the shaft 2 and the member 8, and the spring 16 is situated so that it is coiled about the collar 12.

FIG. 3 is a cross-sectional view of the spray valve 1 and exemplary spray patterns that the valve can generate. In the preferred embodiment of the spray valve, the outer surface of the valve head 3 is angled to define the first orifice 10 so that it emits a relatively thin, conical spray pattern with a surface angled in a range from thirty to forty degrees relative to the spray valve's central axis, as indicated by the angles $\theta_{1A}$, $\theta_{1B}$, $\theta_{1C}$ corresponding to angles of about 30°, 35°, 40°, respectively. The outside surface of the member's flared end portion preferably slopes at an angle greater than or equal to that of the spray pattern surface generated by the first orifice 10. In FIG. 3, the outside surface of the member's flared end portion generates a conical spray pattern with an angle $\theta_2$ of about forty degrees relative to the spray valve's symmetric axis. The spray valve thus preferably generates a fluid spray pattern that has two concentric conical surfaces, with a relatively large surface area, particularly advantageous for fluid deaeration and purification applications. Of course, the spray patterns of FIG. 3 are shown by way of example only, and are not intended to limit the angle or shape of the fluid spray patterns that can be generated by the spray valve 1. Thus, the spray pattern angles can range from about five to about eighty-five degrees with the angle $\theta_1$ smaller than the angle $\theta_2$.

In operation, the spray valve 1 is adjusted by loosening or tightening the retainers 5, 17 by appropriate rotation of the nuts on respective ends of the shaft 2 and members 8, respectively. The nuts 6, 19 are tightened against the retainers 5, 17 to secure their positions on the shaft 2 and the member 8, respectively. The retainer 5 controls the bias exerted by the spring 4 against the valve head 3 in a direction that tends to move the outer surface of the valve head toward the inside surface of the member's flared end portion, and hence in a direction that tends to close the first orifice 10. The spray valve receives a supply of pressurized fluid that flows into the spray valve between the housing's legs, and passes into the hollow interior of the member 8 via the side openings 9, and is confined between the inside surface of the member and the upper surface of the valve head 3. The spray valve operates so that, if the fluid pressure inside the space confined by the valve head and the member, is greater than that communicating with the valve head's and member's exterior surfaces that define the orifice 10, the fluid pressure will be exerted against the valve head 3 in a direction that compresses the spring 4, causing the valve head 3 to be urged in a direction relative to the member's flared end portion, that tends to open the first orifice 10. On the other hand, if the fluid pressure inside the space confined by the valve head and the member, is greater than that communicating with the valve head's and member's exterior surfaces that define the orifice 10, the pressure exerted by the spring 4 urges the valve head 3 toward the member's flared end portion, thus tending to close the first orifice 10. In an equilibrium condition, the force exerted by the spring 4 is compensated by the force exerted by the pressure of the fluid confined by the member and valve head, and the opening size of the first orifice 10 is relatively constant in this circumstance. By controlling the amount of force exerted by the spring 4 against the valve head 3, by tightening or loosening the retainer 5, the initial opening size of the first orifice 10 when the fluid pressure in the space confined by the valve head and member is less than that on the valve head's and member's exterior surfaces, or the amount of fluid pressure required to open the first orifice 10, can be controlled. Importantly, the adjustment of the bias exerted by the spring 4 against the valve head 3 in a direction tending to close the first orifice 10, controls the proportion of the variation of the size of the first orifice for a corresponding variation in the fluid pressure or flow rate through the first orifice. Thus, because the spray valve has the capability to change the size of the first orifice based on the fluid flow rate or the amount of fluid pressure exerted against the valve head from the space confined by the valve head and the member in a proportion that can be adjusted with the retainer 5, the spray valve can be adjusted to produce a spray pattern that is relatively thin, uniform, and continuous over a range of fluid flow rates or pressures.

The bias of the spring 16 in a direction tending to close the second orifice 15 is adjusted in a manner similar to that of the first orifice 10. More specifically, the spring retainer 17 is rotated on the member 8 to move in a direction to compress the spring 16 between the housing 11 and the spring retainer 17. Alternatively, the spring retainer 17 can be rotated in the opposite direction that allows the spring 16 to relax by increasing the separation between the spring retainer 17 and housing's shoulder. A pressurized source of fluid is introduced into the spray valve between the housing's legs, and a portion of this fluid passes to the second orifice 15 defined between the member 8 and the housing's lip 14. By tightening or loosening the retainer 17, the initial opening size or the fluid pressure amount in the space confined by the housing and the member, that is needed to open the second orifice 15, can be adjusted. In addition, by adjusting the bias of the spring 16 in a direction tending to close the second orifice 15 with the retainer 17, the proportional variation of the second orifice 15 to a corresponding variation in fluid flow rate or pressure, can be set so that the spray pattern generated by the second orifice 15 is relatively thin, uniform and continuous for a range of flow rates.

FIG. 4 is a cross-sectional diagram of a first system incorporating the spray valve 1 of this invention. The system of FIG. 4 is a spray/tray-type deaerator. In FIG. 4, the spray valve 1 is inserted into an aperture in a surface 30 of fluid compartment 31 that receives fluid from a pressurized source from inlet 32. A ring gasket 33, preferably made of Teflon™, is situated between the surface 30 and the flange 20, to form a water-tight seal upon tightening nuts and bolts 34 that extend through the bores 21 defined in the valve's flange. The pressurized fluid from the compartment 31 flows through the valve 1, exiting the valve at the first and second orifices 10, 15. The respective spray patterns generated by the valve 1 are heated in a steam environment contained in compartment 35. Because the surface area of the spray patterns are relatively large in surface area and thin in width, the fluid in the spray patterns is quickly heated in the steam environment. The steam's heating action causes a reduction of the solubility of noncondensable gases in the fluid, and hence the fluid releases these gases into the steam environment. These gases are exhausted from the compartment 35 through vent 36. The fluid in the spray patterns cools the steam that contacts the fluid to a degree, causing a portion of the steam to condense. The sprayed fluid and condensed steam fall to stack assembly 36 that has a plurality of tray units each with several trays that are approximately U-shaped in cross-section. The trays are staggered from top to bottom both within each unit and from the top to the bottom of the entire tray unit assembly, so that water overflowing from one tray falls into a tray on a level immediately below the one tray. The fluid is thus detained for a significant time in the tray unit assembly. Steam is introduced into compartment 37 from steam inlet 38. The compartment 37 communicates with the bottom of the tray unit assembly so that steam is directed to flow upward through the stacked tray units, and thus counter-current to the fluid falling through the tray unit assembly. The incoming steam is relatively pure so that noncondensable gases are stripped from the fluid by the steam that thoroughly mixes with the falling fluid as it rises through the tray unit assembly. The fluid 39 in the bottom of the compartment 37 is thus deaerated and purified, and can be fed to a boiler (not shown) for heating, for example.

Although the spray/tray-type deaerator system of FIG. 4 has a counter-current configuration in which the water from the spray valve 1 is directed generally against the flow of steam rising through the stack assembly 36, the system of FIG. 4 is given by way of example and not limitation. Accordingly, it should be understood that the invented spray valve can be used with co-current deaerator systems in which the spray valve 1 directs sprayed fluid in the same direction as the steam flow.

Figure 5:
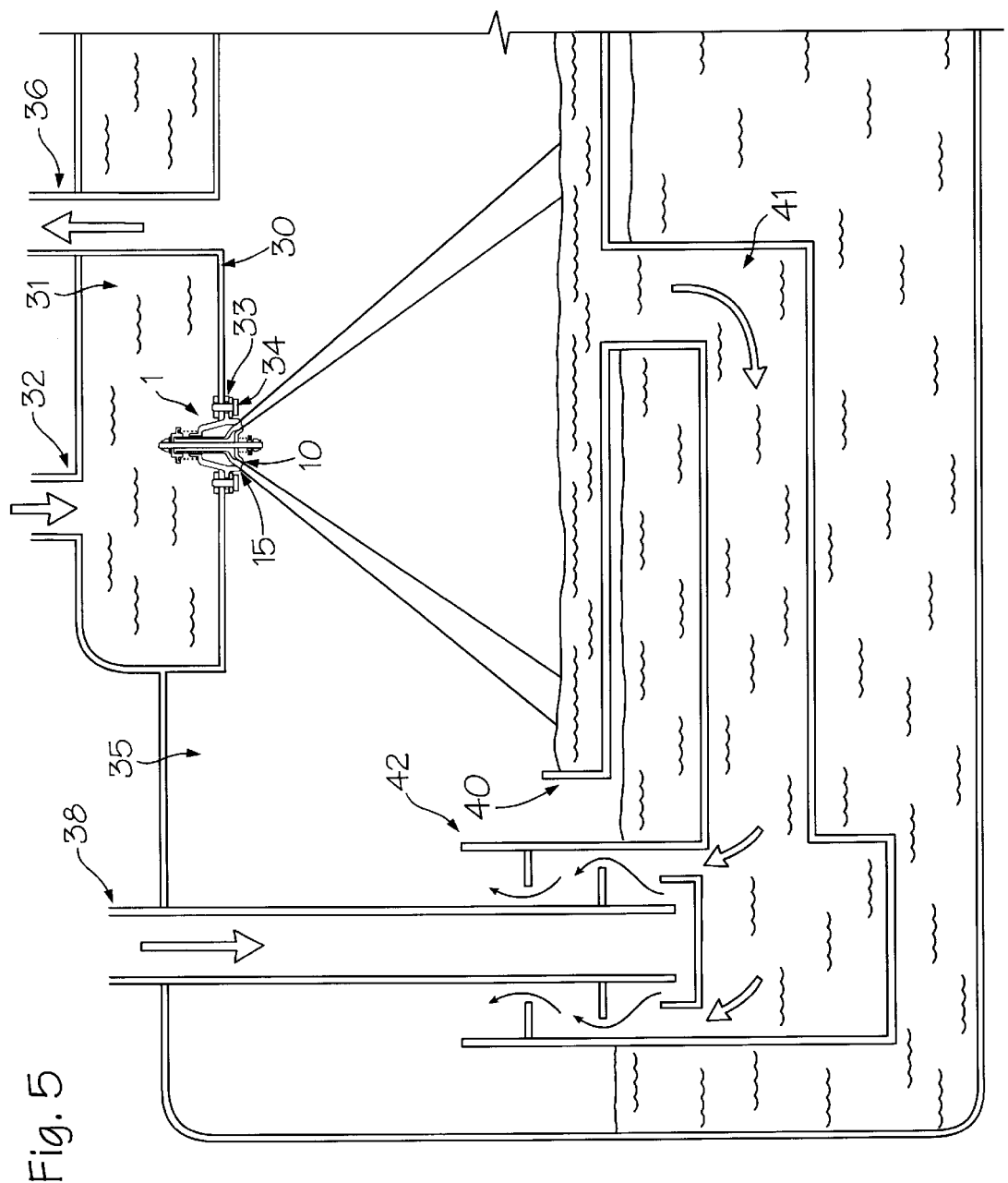
FIG. 5 is a cross-sectional view of a second system incorporating the spray valve.

FIG. 5 is a cross-sectional view of a second system incorporating the spray valve 1 of this invention. In FIG. 5, similarly to FIG. 4, the spray valve 1 is mounted to the surface 30 of the fluid compartment 31 that receives fluid from a pressurized source through the inlet 32. The fluid flows from the compartment 31 into the spray valve 1 and exits the spray valve from the orifices 10, 15 in two spray patterns. A steam environment present in the compartment 35 heats the fluid in the spray patterns so that noncondensable gas is released from the fluid. The noncondensable gas is vented from the compartment 35 through vent 36. The fluid and the steam condensed by contact with the fluid, falls to a collection basin 40 with a relatively large surface area that detains the fluid for exposure to the relatively pure steam environment that strips noncondensable gases from the fluid. From the collection basin 40, the fluid flows through a conduit 41 into a scrubber 42 into which steam is injected through the steam inlet 38. The fluid mixes with the steam and releases any remaining noncondensable gases. Fluid spills out of the top of the scrubber 42 and rests in the bottom of the compartment 35. The fluid contained in the bottom of the compartment 35 sufficiently free of noncondensable gases that it can be piped to a boiler or the like (not shown) for use in generating steam without significant corrosion of boiler parts by noncondensable gases.

The spray valve 1 can be modified relative to the particular embodiment of FIGS. 1–5 without departing from the scope of this invention. For example, the outer edge surface of the valve head 3 and the outer edge of the member's flared end can slope at angles different from those shown and described. The respective slope angles of the outer surfaces of the valve head and the member's flared end can be angled between 0 and 90 degrees, with the outer edge of the member's flared end sloping at a larger angle than the slope of the outer edge of the valve head. Further, along an angular direction relative to the spray valve's center, symmetric axis, the valve head, the member's flared end portion and the lip can define the orifices 10, 15 to be any simple closed curve surfaces other than simple circular shapes. In addition, the springs 4, 16 can be replaced with resilient parts other than springs under some circumstances. For example, in low-temperature environments, the springs 4, 16 can be replaced with tubes of rubber or other resilient material. Also, the spring retainer 5 and nut 6 can be replaced with a large nut or clamp or the like, that can be moved and secured at a desired position along the shaft's longitudinal axis to control the bias of the spring 4 or other resilient material. Likewise, the spring retainer 17, the washer 18 and the nut 19 can be replaced with a large nut or clamp that can be moved along and secured at a desired position along the shaft's longitudinal axis to control the bias of the spring 16 or other resilient material. The above and other modifications are intended to be within the scope of the invention.

The first method in accordance with this invention includes a step of adjusting a first bias tending to close a first continuous orifice defined by a spray valve, and a step of adjusting a second bias tending to close a second continuous orifice defined by the spray valve, that is situated outwardly of, and that encircles, the first orifice. The first method also includes a step of forcing fluid through the first and second orifices to generate respective first and second continuous spray patterns configured so that the second spray pattern envelops the first spray pattern. Preferably, the adjusting steps control the proportions by which the first and second orifices vary in dependence upon respective fluid flow rates through the orifices. The first method can be used to deaerate or purify a fluid. For example, if the fluid is water, the two spray patterns can be generated in a steam environment to deaerate the water.

A second method in accordance with this invention includes a step of varying an opening size of a first continuous orifice defined by a spray valve, that generates a first spray pattern, based on a first fluid flow rate through the first orifice, and a step of varying an opening size of a second continuous orifice defined by the spray valve, that generates a second spray pattern that envelops the first conical spray pattern, based on a second fluid flow rate through the second orifice. The second method can also include a step of adjusting the spray valve to control a proportion of the varying of the first or second orifice sizes based on the fluid flow rates therethrough.

The first and second methods of this invention are highly effective to produce large area fluid spray patterns that are relatively thin, uniform and continuous, to allow highly effective fluid deaeration and purification.

The many features and advantages of the present invention are apparent from the detailed specification and thus, it is intended by the appended claims to cover all such features and advantages of the described apparatus and methods which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

We claim:

1. An apparatus comprising:

a shaft;

a valve head slidably mounted on the shaft;

a member defining a hollow interior through which the shaft extends, the member having a flared end portion, an outer edge surface of the valve head opposing an inside surface of the flared end portion to define a first orifice;

a housing defining an open interior through which the shaft and member extend, the housing having a lip, an outside surface of the member's flared end portion opposing an inside surface of the lip to define a second orifice;

a first adjustable bias unit coupled to the shaft and the valve head to urge the outer edge of the valve head toward the inner surface of the member; and a second adjustable bias unit coupled to the member and the housing to urge the outer edge of the flared portion toward an inner surface of the lip, the shaft having a stop situated in proximity to a first end of the shaft, and the first adjustable bias unit including first spring fitted over the first end of the shaft, and having a first end engaging with a side of the valve head opposite the valve head's side that is closer to the shaft's stop; and a first spring retainer threaded on the shaft and engaging with a second end of the spring.

2. An apparatus as claimed in claim 1, wherein the housing has a first end opposite to a second end at which the lip is situated, that is at least partially open to receive the fluid flow, a first portion of the fluid flow moving through the housing into openings defined in the member, and further moving through the member's hollow interior and through the first orifice defined between the valve head and the member, and a second portion of the fluid flow moving through the housing and through the second orifice defined between the member and the housing.

3. An apparatus as claimed in claim 1, wherein the first bias unit is adjustable by rotating the first spring retainer relative to the shaft to adjust the degree to which the spring retainer compresses the first spring against the valve head.

4. An apparatus as claimed in claim 1, further comprising:
a first nut threaded to the first end of the shaft, and engaging with the first spring retainer to lock the spring retainer in position on the shaft.

5. An apparatus comprising:
a shaft;
a valve head slidably mounted on the shaft;
a member defining a hollow interior through which the shaft extends, the member having a flared end portion, an outer edge surface of the valve head opposing an inside surface of the flared end portion to define a first orifice;
a housing defining an open interior through which the shaft and member extend, the housing having a lip, an outside surface of the member's flared end portion opposing an inside surface of the lip to define a second orifice;
a first adjustable bias unit coupled to the shaft and the valve head to urge the outer edge of the valve head toward the inner surface of the member; and
a second adjustable bias unit coupled to the member and the housing to urge the outer edge of the flared portion toward an inner surface of the lip,
the housing having a collar on a first end of the housing opposite to a second end of the housing at which the lip is situated, the member and the shaft extending through the collar, and the second adjustable bias unit including
a second spring having a first end fitted over the collar, the second spring encircling the member and the shaft; and
a second spring retainer threaded to the member and engaging with a second end of the spring.

6. An apparatus as claimed in claim 5, further comprising:
a washer slidably mounted on the shaft and engaging with the second spring retainer; and
a second nut threaded to the second end of the shaft, and engaging with the washer.

7. An apparatus as claimed in claim 5, wherein the housing includes spaced legs to support the collar relative to the remainder of the housing.

8. An apparatus comprising:
a shaft;
a valve head slidably mounted on the shaft;
a member defining a hollow interior through which the shaft extends, the member having a flared end portion, an outer edge surface of the valve head opposing an inside surface of the flared end portion to define a first orifice;
a housing defining an open interior through which the shaft and member extend, the housing having a lip, an outside surface of the member's flared end portion opposing an inside surface of the lip to define a second orifice;
a first adjustable bias unit coupled to the shaft and the valve head to urge the outer edge of the valve head toward the inner surface of the member; and a second adjustable bias unit coupled to the member and the housing to urge the outer edge of the flared portion toward an inner surface of the lip,
the lip, the outside and inside surfaces of the flared end portion, and the outer edge surface of the valve head being smoothly curved.

9. An apparatus comprising:
a shaft having first and second threaded ends, and a stop situated in proximity to the first end;
a valve head slidably mounted on the first end of the shaft to an extent limited by the stop;
a first spring having first and second ends, and situated on the first end of the shaft with the spring's first end engaging with the valve head;
a first spring retainer threaded onto the first end of the shaft, and engaging with the spring's second end;
a hollow member defining an open interior with first and second open ends communicating with the member's open interior, the member having a tube-like portion at its first end, and a flared portion at its second, opposite end, the tube-like portion defining at least one side opening communicating with the hollow member's open interior, the shaft fitting in the open interior of the hollow member so that the valve head at least partially closes the second end of the hollow member and defines a first orifice between an outer surface of the valve head and an opposing inside surface of the flared portion;
a housing having a collar at its first end and a lip at its second end, the shaft and member situated inside of the housing's second end so that the shaft and member extend through and are surrounded by the collar, so that the flared portion of the member at least partially closes the housing's second end, and so that a second orifice is defined between an inside surface of the lip and an outside surface of the flared portion;
a spring having a first end fitted over the collar, and a second end, the spring encircling the shaft and the member; and
a spring retainer threaded onto the member's first end, and engaging with the second end of the spring.

10. An apparatus as claimed in claim 9, wherein a proportion of the variation of the size of the first orifice based on a corresponding variation of a fluid flow rate through the first orifice, is adjustable by loosening or tightening the first spring retainer to control the degree to which the first spring urges the valve head toward the flared portion of the member.

11. apparatus as claimed in claim 9, further comprising:
a first nut threaded onto the first end of the first shaft, and engaging with the first spring retainer.

12. An apparatus as claimed in claim 9, further comprising:
a washer fitted over the shaft's first end and engaging with the spring retainer; and
a nut threaded to the first end of the shaft and engaging with the washer.

13. An apparatus as claimed in claim 9, wherein a proportion of a variation of the size of the second orifice based on a corresponding variation of a fluid flow rate through the second orifice, is adjustable by loosening or tightening the second spring retainer to control the degree to which the second spring urges the flared portion toward the lip of the housing.

14. An apparatus as claimed in claim 9, wherein the housing includes a flange for fastening the spray valve to a surface.

15. An apparatus as claimed in claim 9, wherein the housing includes spaced legs to support the collar relative the remainder of the housing, and to allow fluid to pass into the open interior of the housing to the first and second orifices.

16. An apparatus as claimed in claim 9, wherein the outer surface of the valve head and the inner surface of the flared portion are rounded in proximity to the first orifice, and the outer surface of the flared portion and the inner surface of the lip are rounded in proximity to the second orifice.

* * * * *